(12) United States Patent
Yokouchi

(10) Patent No.: US 6,212,019 B1
(45) Date of Patent: Apr. 3, 2001

(54) OBJECTIVE LENS DRIVING SYSTEM IN A OPTICAL PICK-UP AND METHOD OF MODULATING THE RESONANCE FREQUENCY OF ITS LENS HOLDER

(75) Inventor: Tsuyoshi Yokouchi, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 08/833,588

(22) Filed: Apr. 7, 1997

(30) Foreign Application Priority Data

Apr. 22, 1996 (JP) .................................................. 8-099727

(51) Int. Cl.[7] ....................................................... G02B 7/02
(52) U.S. Cl. ........................... 359/814; 359/823; 359/824
(58) Field of Search .................................... 359/813, 814, 359/823, 824, 694, 696; 369/44.22, 244

(56) References Cited

U.S. PATENT DOCUMENTS

| | | | |
|---|---|---|---|
| 4,843,600 | * 6/1989 | Miyajima et al. ..................... 369/13 |
| 4,998,802 | 3/1991 | Kasuga et al. ....................... 359/814 |
| 5,132,850 | * 7/1992 | Hagiwara ............................. 359/813 |
| 5,506,732 | * 4/1996 | Mori ..................................... 359/824 |
| 5,659,525 | * 8/1997 | Miyamae et al. ................. 369/44.22 |
| 5,844,881 | * 12/1998 | Kasuga et al. ....................... 369/244 |

* cited by examiner

Primary Examiner—Georgia Epps
Assistant Examiner—Saud Seyrafi
(74) Attorney, Agent, or Firm—Reed Smith LLP

(57) ABSTRACT

An objective lens driving system in an optical pick-up comprises a lens holder which has a shaft hole and holds an objective lens, a fixed member which has a journal inserted into the shaft hole, a magnet and a driving coil which are arranged opposite each other so as to generate a magnetic force for driving the lens holder along the journal and a magnetic piece which is arranged opposite the magnet to hold the lens holder at a predetermined neutral position using the magnetic force generated between the magnet and the driving coil while the driving coil is not excited and is magnetized until it is saturated by emf from the magnetic field generated by the magnet. Each of the magnet and magnetic piece has an associated magnetic flux density; the magnetic flux density generated by the magnet is larger than the saturation flux density around the magnetic piece.

13 Claims, 3 Drawing Sheets

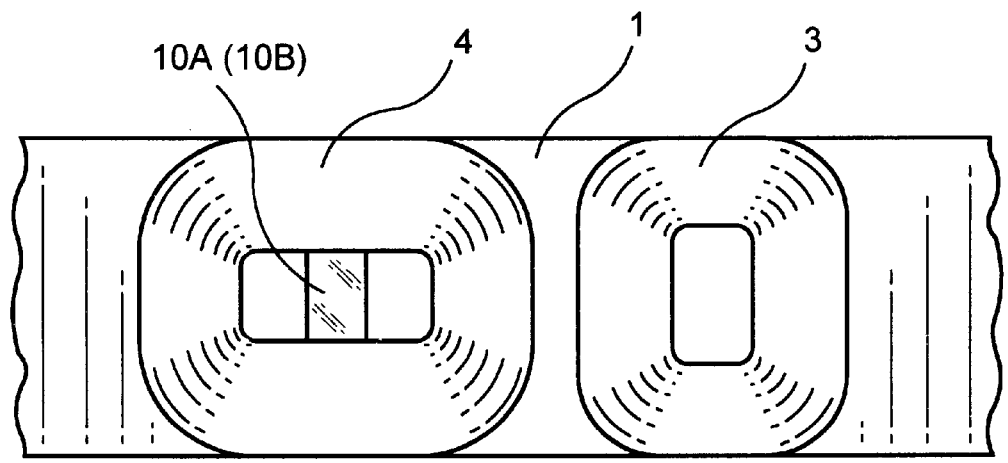
F I G. 3
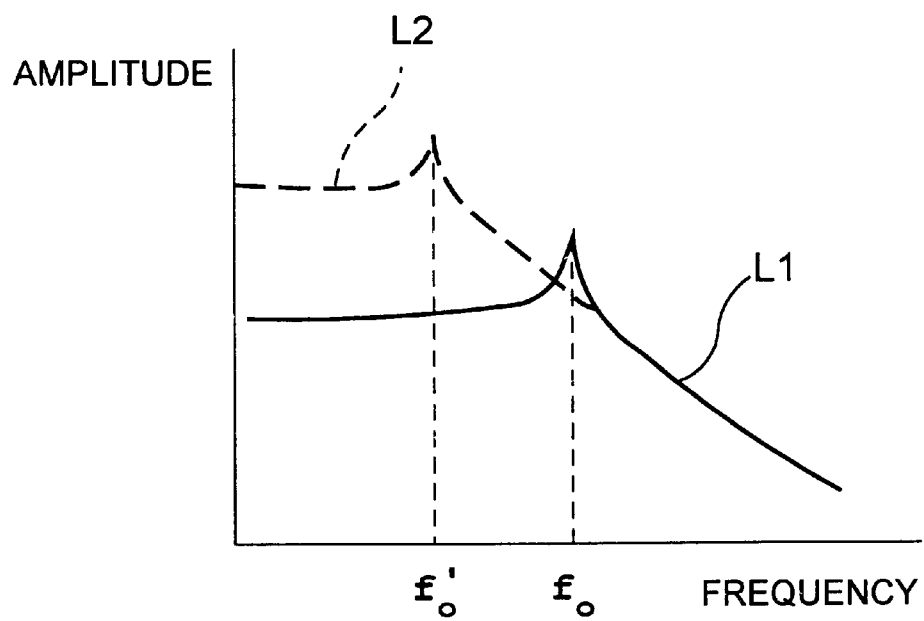
F I G. 4

OBJECTIVE LENS DRIVING SYSTEM IN A OPTICAL PICK-UP AND METHOD OF MODULATING THE RESONANCE FREQUENCY OF ITS LENS HOLDER

BACKGROUND OF THE INVENTION a) Field of the Invention

The present invention relates to a slidable-on-a-shaft type objective lens driving system in an optical pick-up applied to an optical disk apparatus and the like. More specifically, it relates to a modulation technique to optimize the resonance frequency of the lens holder which holds the objective lens in this type of objective lens driving system.

b) Description of the Related Art

As shown in FIG. 1 or 7 in U.S. Pat. No. 4,998,802, in the slidable-on-a-shaft type objective lens driving system in an optical pick-up, the lens holder 1 (a movable member) is slidably held along the journal 7 formed on a fixed member and rotatably held around the journal 7. Constructed between the lens holder 1 and the fixed member are magnetic driving circuits for focusing and for tracking. In general, a driving coil for tracking 3 and a driving coil for focusing 4 are mounted on the outer periphery of the lens holder 1; at the positions on the fixed member opposite the aforementioned coils, a magnet for tracking 6b and a magnet for focusing 6a are mounted. When the driving coil for focusing 4 is excited, the lens holder 1 slides along the journal 7 to correct focusing errors of the objective lens 2 mounted in the lens holder 1. In the same manner, when the driving coil for tracking 3 is excited, the lens holder 1 rotates around the journal 7 to correct focusing errors of the objective lens 2.

At the position on the outer periphery of the lens holder 1, opposite the magnet for focusing 6a, a magnetic piece 10 is mounted as shown in FIGS. 11 and 12 of the U.S. Pat. No. 4,998,802. By using the magnetic force generated between the magnetic piece 10 and the magnet for focusing 6a under the condition the driving coils 3 and 4 are not excited, the lens holder 1 is held at a predetermined neutral position which is a home position for positional control.

In such conventional technology, a magnetic spring is normally working on the lens holder 1; therefore, the relationship between the frequency and amplitude of the vibration when the lens holder 1 freely vibrates is as shown by a solid line L1 in FIG. 4 of this invention. Normally, the size of the magnetic piece 10 is adjusted so that the resonance frequency fo of the lens holder 1 is slightly higher than the optical recording disk's rotations per minute.

In such an objective lens driving system, the attraction force F exerted on the magnetic piece 10 from the magnetic field of the magnet 6 is proportional to the product of the following: the constant of proportionality (K); the volume (V) of the magnetic piece 10; the permeability ($\mu$) of the magnetic piece 10; the strength (H) of the magnetic field exerted on the magnetic piece 10; and the magnetic declination (dH/dx) of the magnetic field on which the magnetic piece 10 is arranged. That is, the attraction force F is expressed in the following equation:

$$F \propto K \times V \times \mu \times H \times (dH/dx) \quad (1)$$

Then, in order to modulate the resonance frequency of the lens holder 1 from (fo) to (fo'), the magnetic piece 10 is replaced with a smaller piece to minimize the attraction force F and thereby the spring constant of the lens holder 1 is minimized. Consequently, as shown by dotted lines L2 in FIG. 4 of this invention, the resonance frequency of the lens holder 1 can be shifted to the fo' side.

If the resonance frequency of the lens holder 1 is modulated by changing the size and shape of the magnetic piece 10, as is done conventionally, there is a problem in that one cannot predict to which level the resonance frequency shifts. This is because, even if the same volume and the same shape are used for the magnetic pieces, the permeability $\mu$ sometimes varies due to the manunfacturing hysteresis or distortion of the individual magnetic piece. Accordingly, the attraction force F exerted on the replace magnetic piece cannot be predicted accurately, and therefore the resonance frequency after adjusting the lens holder 1 cannot be predicted.

OBJECT AND SUMMARY OF THE INVENTION

The primary objective of the present invention, in the shaft-sliding type objective lens driving system having a magnetic piece which returns the lens holder to the neutral position and holds it thereat, is to provide a structure with which, even when the specification of the magnetic piece is changed for modulating the resonance frequency, the resonance frequency of the lens holder with different magnetic pieces can be predicted in advance, and to propose a method of modulating the resonance frequency.

In accordance with the invention, an objective lens driving system in an optical pick-up comprises a lens holder which has a shaft hole and holds an objective lens, a fixed member which has a journal inserted into the shaft hole, a magnet and a driving coil which are arranged opposite each other so as to generate a magnetic force for driving the lens holder along the journal and a magnetic piece which is arranged opposite the magnet to hold the lens holder at a predetermined neutral position using the magnetic force generated between the magnet and the driving coil while the driving coil is not excited and is magnetized until it is saturated by emf from the magnetic field generated by the magnet. Each of the magnet and magnetic piece has an associated magnetic flux density; the magnetic flux density generated by the magnet is larger than the saturation flux density around the magnetic piece.

BRIEF DESCRIPTION OF THE DRAWINGS

In the drawings:

FIG. 3 is a partial side view of a lens holder;

FIG. 4 is a graph showing the relationship between the amplitude and the frequency when the lens holder freely vibrates in the objective lens driving system in an optical pick-up.

DESCRIPTION OF THE PREFERRED EMBODIMENTS

Figure 1:
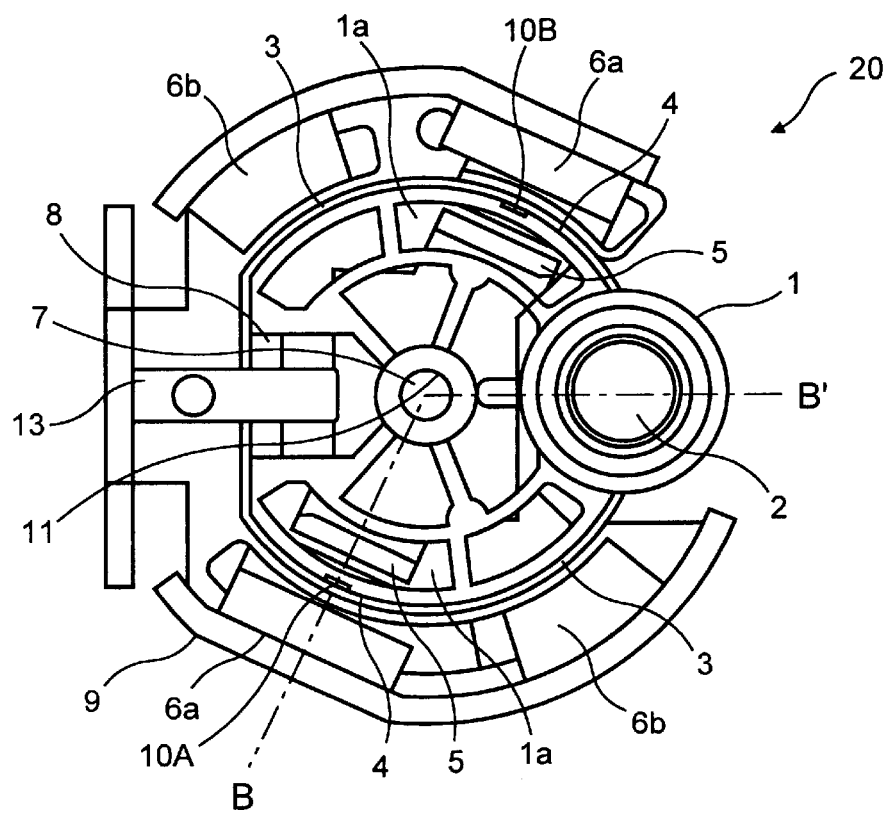
FIG. 1 is a plan view of an objective lens driving system in an optical pick-up of this invention.

A preferred embodiment of the present invention will be described hereinafter referring to the drawings.

Figure 2:
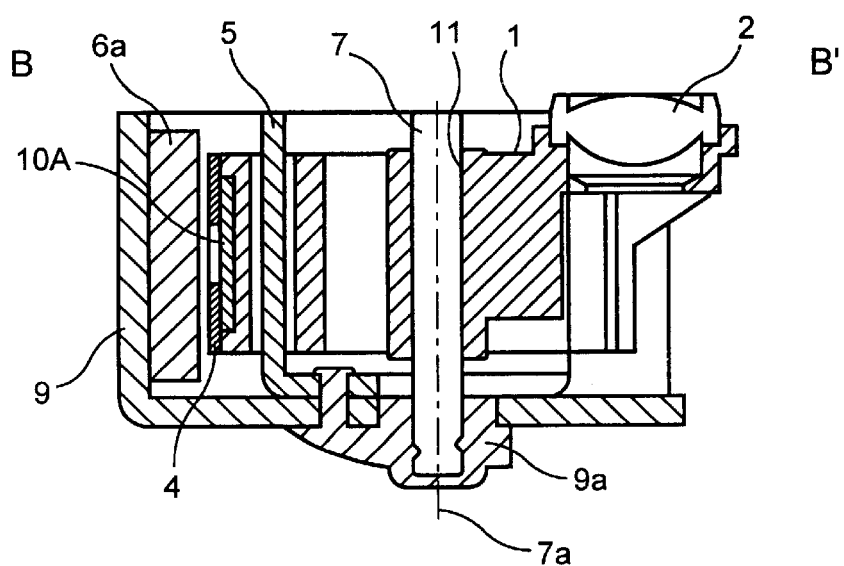
FIG. 2 is a cross-sectional view of the objective lens driving system in an optical pick-up of this invention, cut by the B—B' line of FIG. 1.

In FIGS. 1 and 2, the slidable-on-a-shaft type objective lens driving system 20 has a lens holder 1 (a movable member) which has a shaft hole 11 at the center. A journal 7 (a fixed member) is inserted into the shaft hole 11 such that the lens holder 1 slides along the journal 7 and at the same time rotates around the journal 7.

An objective lens 2 is mounted in the lens holder 1 such that its optical path is parallel to the axis 7a of the journal 7. Also, a balancer 8 is mounted in the lens holder 1 such that it is opposite the objective lens putting the journal 7 therebetween. On the outer periphery of the lens holder 1, a pair of driving coils for focusing 4 and a pair of driving coils 3 for tracking are adhered at two symmetrical positions putting the journal 7 therebetween, as shown in FIG. 3.

The journal 7 is secured by press-fitting or adhering to a boss 9a formed at the center of an outer yoke 9 which is a component of the fixed member. Standing portions are constructed on the outer yoke 9 such that they enclose the journal 7. Each of the standing portions is formed along an arc whose center is at the journal 7; a pair of magnets for focusing 6a and a pair of magnets for tracking 6b are secured to the inner surface of the standing portions. The magnets for focusing 6a are magnetized so as to be polarized such that the N pole and the S pole are arranged in the direction of the axis 7a of the journal 7. On the other hand, the magnets for tracking 6b are magnetized so as to be polarized such that the N pole and the S pole are arranged in the direction orthogonal to that of magnetization of the magnets for focusing 6a (in the circumferential direction having the journal 7 at the center). For this reason, when the driving current flows in the driving coil for focusing 4 via a flexible substrate 13, a thrust is generated due to the driving current and the magnetic flux in the magnetic circuit; the lens holder 1 is shifted in the focusing direction to adjust the objective lens 2 mounted thereon for focusing. Also, when the driving current flows in the driving coils for tracking 3 via the flexible substrate 13, the lens holder 1 is shifted in the tracking direction to adjust the objective lens 2 mounted thereon for focusing.

An inner yoke 5 is superposed on the outer yoke 9; the standing portions of the inner yoke 5 upwardly pass through window holes 1a of the lens holder 1 to face each of the driving coils 4 and the magnets 6a.

Also, the objective lens driving system 20 of the present invention has a pair of magnetic pieces 10A and 10B. These magnetic pieces 10A and 10B are buried on the outer wall of the lens holder 1, respectively at the position facing the center between the magnetic poles of the magnets for focusing 6a. Here, the magnetic pieces 10A and 10B are set such that their thickness is 0.1 mm, their height (the dimension in the direction of the axis 7a of the journal 7) is 4 mm which is shorter than the height of the magnets 6a. Also their width (the dimension in the circumferential direction of the journal 7) of the magnetic pieces 10A and 10B is 0.8 mm which is considerably shorter than that of the magnets 6a. Consequently, under the condition where the driving coils for focusing 4 and for tracking 3 are not excited, by means of the magnetic attraction force exerted on the magnetic pieces 10A and 10B from the magnets for focusing 6a, the lens holder 1 is balanced at a predetermined position in the circumferential direction around the journal 7 and in the direction of the axis 7a. This condition is where the magnetic spring is working on the lens holder 1. Under such a condition where the lens holder 1 is held at the neutral position and when the lens holder 1 freely vibrates, the frequency and amplitude of the vibration is in the relationship shown by the solid line L1 in FIG. 4; the resonance frequency fo of the lens holder 1 is modulated so as to be a slightly higher value than the optical recording disk's rotations per minute.

In the objective lens driving system of this configuration, the present invention uses the magnetic pieces 10A and 10B which are magnetically saturated due to the emf from the magnetic field generated by the magnet 6a. Further, the density of the magnetic flux around the magnet 6a is set to be larger than the saturation flux density of the magnetic pieces 10A and 10B. Consequently, the resonance frequency of the lens holder with the different specification of the magnetic pieces can be predicted accurately in advance.

In other words, by setting the density of the magnetic flux in a plane orthogonal to the direction of a primary magnetic flux of the magnet 6a to be less than the saturation flux density of the magnetic pieces 10A and 10B, the magnetic pieces 10A and 10B are always in the magnetically saturated condition, with which the permeability $\mu$ is constant in the magnetic pieces 10A and 10B of the same size; thus the attraction force F can be predicted in advance based on the saturation flux density of each of the magnetic pieces 10A and 10B.

Then, in the present invention, the magnetic pieces 10A and 10B are made of a material having a different saturation flux density from the conventional material in order to lower the resonance frequency fo of the lens holder 1, where the frequency and amplitude of the vibration is in the relationship shown by the solid line L1 in FIG. 4, down to the resonance frequency fo' shown by the dotted lines L2 in FIG. 4. In particular, the magnetic pieces made of silicon steel (whose saturation flux density is 1.8T) is replaced with the magnetic pieces made of permalloy (whose saturation flux density is 0.75T that is smaller than that of silicon steel), and these replacing magnetic pieces 10A and 10B made of permalloy are used in the saturation region.

With this configuration, changing the magnetic pieces 10A and 10B minimizes the attraction force F exerted thereon, and the spring constant in the vibration system becomes smaller. Therefore, one can predict that the resonance frequency fo of the lens holder 1 shifts to the lower frequency side (the resonance frequency fo' side) as shown in FIG. 4, and how much it shifts. On the other hand, when shifting the resonance frequency fo of the lens holder 1 to the higher side, one can also predict how much it shifts.

In other words, according to the present invention, the magnetic pieces 10A and 10B are used exclusively in the magnetically saturated region; therefore, the attraction force F exerted on the magnetic pieces 10A and 10B is expressed by the following equation (2):

$$F \, k \times V \times Bs \times H \times (dH/dx) \tag{2}$$

where Bs is a saturation flux density. Accordingly, the attraction force F exerted on the magnetic pieces 10A and 10B is always defined by the saturation flux density Bs and is not affected by the variation of the permeability $\mu$. This is because unlike the permeability $\mu$, the saturation flux density Bs is not affected by the manufacturing hysteresis of the magnetic pieces 10A and 10B. For this reason, even when the magnetic pieces are replaced with other magnetic pieces to modulate the resonance frequency of the lens holder 1, the saturation flux densities Bs (saturation magnetization) are the same magnitude in the magnetic pieces of the same specification; therefore, the magnitude of the magnetic attraction force F exerted on the magnetic pieces can be known in advance. Thus, even when the specification of the magnetic pieces 10A and 10B is changed, one can predict how much the resonance frequency of the lens holder 1 shifts.

In particular, although the magnetic pieces 10A and 10B are normally magnetically saturated due to the magnetic field exerted from the magnet 6a, when a permalloy is used for the magnetic pieces 10A and 10B, the saturation flux density is at the lower side as in the present invention. For this reason, permalloy is suitable to set the resonance frequency of the lens holder 1 at the lower side.

Figure 5:
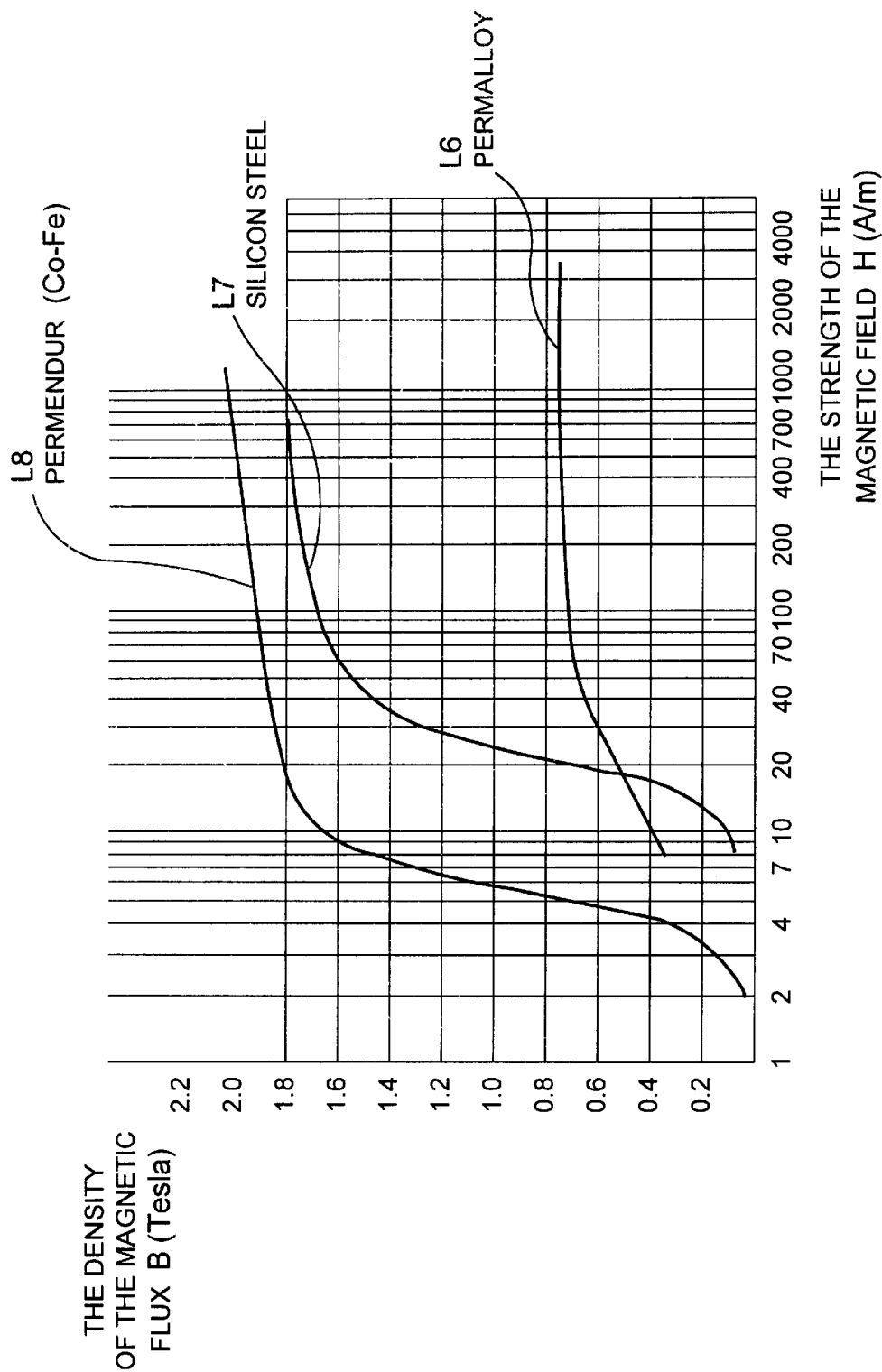
FIG. 5 shows the direct-current magnetization curve for each of several magnetic materials.

In other words, as the direct-current magnetization curves of permalloy, silicon steel, and permendur (Co-Fe) respectively shown by the solid lines L6, L7, and L8 in FIG. 5, the magnitude of the saturation flux density of each magnetic material becomes smaller in the order of permendur, silicon steel, and permalloy. Therefore, when lowering the resonance frequency of the lens holder 1 (when lowering the attraction force exerted on the magnetic pieces 10A and 10B), making the magnetic pieces 10A and 10B of silicon steel would make the pieces 10A and 10B too small, causing the problems that they are fragile and difficult to handle. On the other hand, like this embodiment, if the magnetic pieces 10A and 10B are constituted of a material such as permalloy, whose saturation flux density is smaller than that of silicon steel, the magnetic pieces 10A and 10B of an appropriate size can be obtained, thus facilitating handling the magnetic pieces 10A and 10B.

Note that, in the objective lens driving system 20 in an optical pick-up, the required resonance frequency varies according to each of the apparatus; therefore, the material used for magnetic pieces 10A and 10B is not limited to permalloy, but may be also made of silicon steel or permendur. In either case, the objective of the present invention is to provide a structure in which the magnitude of the magnetic field generated by the magnet 6a is stronger than that in the magnetically saturated region of the magnetic pieces 10A and 10B. Therefore, while preparing various magnetic pieces 10A and 10B constituted of not only permalloy, silicon steel, or permendur, but also magnetic material having different saturation flux densities Bs, the magnetic pieces 10A and 10B which have the optimal saturation flux density Bs for the apparatus are selected according to the given magnitude of the resonance frequency of the lens holder 1. Doing so, the resonance frequency of the lens holder 1 can be accordingly modulated simply by changing the magnetic pieces 10A and 10B with those of the same size.

Also, by varying the volume (V) of the magnetic pieces 10A and 10B while maintaining k, Bs, and (dH/dx) constant in the above equation (2), the attraction force F exerted on the magnetic pieces 10A and 10B can be adjusted. Note that even this case requires the density of the magnetic flux generated by the magnet 6a to be larger than the saturation flux density Bs of the magnetic pieces 10A and 10B, and the magnetic pieces 10A and 10B to be magnetically saturated.

Also the magnetic pieces 10A and 10B may be arranged on the outer periphery of the lens holder 1 such that they are surrounded by the driving coils 3. Further, they may be buried in the lens holder 1. Moreover, the magnetic pieces 10A and 10B may be arranged respectively opposite the magnet for focusing 6a and the magnet for tracking 6b. In other words, two pairs of magnetic pieces 10A and 10B may be provided. Furthermore, in the above embodiment, the driving coils 3 and 4 are arranged on the lens holder 1 side, and the magnets 6a and 6b are arranged on the fixed member side. On the other hand, however, the driving coils 3 and 4 may be arranged at the fixed member side, and the magnets 6a and 6b may be arranged on the lens holder 1 side. In this case, the magnetic pieces 10A and 10B should be arranged on the fixed member.

As described above, the objective lens driving system in an optical pick-up of this invention uses magnetic pieces whose saturation flux density is smaller than the magnetic flux density of the primary magnetic flux generated by the magnet, for returning the lens holder to a neutral position. Therefore, according to the present invention, the attraction force exerted on the magnetic pieces is affected by the saturation magnetization but not by the permeability, so the magnitude of the magnetic attraction force can be predicted even when the specification of the magnetic pieces is changed. For this reason, even if the specification of the magnetic pieces is changed to modulate the resonance frequency of the lens holder, the attraction force exerted on the magnetic pieces can be predicted in advance as long as they are used under the magnetically saturated condition. Thus, the magnitude of the resonance frequency of the lens holder after the modulation can be predicted.

While the foregoing description and drawings represent the preferred embodiments of the present invention, it will be obvious to those skilled in the art that various changes and modifications may be made therein without departing from the true spirit and scope of the present invention.

What is claimed is:

1. An objective lens driving system in an optical pick-up comprising:
    a lens holder which has a shaft hole and holds an objective lens;
    a fixed member which has a journal inserted into said shaft hole;
    a magnet and a driving coil which are arranged opposite each other so as to generate a magnetic force for driving said lens holder along said journal; and
    a magnetic piece which is arranged opposite said magnet to hold said lens holder at a neutral position using said magnetic force generated between said magnet and said driving coil while said driving coil is not excited, said magnetic piece being magnetized until it is saturated by emf from the magnetic field generated by said magnet;
    each of said magnet and magnetic piece having an associated magnetic flux density and wherein the magnetic flux density generated by said magnet is larger than the saturation flux density around said magnetic piece.

2. The objective lens driving system in an optical pick-up as set forth in claim 1, wherein said magnetic piece is made of a magnetic material of smaller saturation flux density than that of silicon steel.

3. The objective lens driving system in an optical pick-up as set forth in claim 2, wherein said magnetic piece is made of permalloy, said permalloy setting the resonance frequency of the lens holder at its lower side.

4. The objective lens driving system in an optical pick-up as set forth in claim 1, wherein an attraction force exerted on the magnetic pieces is defined by a saturation flux density, said attraction force not being affected by a variation of a permeability of the magnetic pieces.

5. The objective lens driving system in an optical pick-up as set forth in claim 1, wherein the magnetic pieces remain in a magnetically saturated condition by setting a density of a magnetic flux in a plain orthogonal to a direction of a primary magnetic flux of said magnet to be less than a saturation flux density of the magnetic pieces.

6. A method of modulating the resonance frequency of a lens holder in an objective lens driving system of an optical pick-up having:
    a lens holder which holds an objective lens and has a shaft hole;
    a fixed member which has a journal inserted into said shaft hole;
    a driving coil and a magnet which are arranged opposite each other so as to generate a magnetic force for driving said lens holder along said journal; and a magnetic piece which is arranged opposite said magnet to hold said lens holder at a neutral position using said magnetic force generated between said magnet and said driving coil while said driving coil is not excited, said method comprising the steps of:

using a magnetic piece that is magnetized until it is saturated by the emf from the magnetic field generated by said magnet; and changing said magnetic piece to another magnetic piece with different saturation flux density to modulate the resonance frequency of said lens holder.

7. The method of modulating the resonance frequency of a lens holder in an objective lens driving system of an optical pick-up as set forth in claim 6, wherein said magnetic piece is made of a magnetic material of a smaller saturation flux density than that of silicon steel.

8. The method of modulating the resonance frequency of a lens holder in an objective lens driving system of an optical pick-up as set forth in claim 6, wherein said magnetic piece is made of permalloy, said permalloy setting the resonance frequency of the lens holder at its lower side.

9. The method of modulating the resonance frequency of a lens holder in an objective lens driving system of an optical pick-up as set forth in claim 6, wherein an attraction force exerted on the magnetic pieces is defined by a saturation flux density, said attraction force not being affected by a variation of a permeability of the magnetic pieces.

10. The method of modulating the resonance frequency of a lens holder in an objective lens driving system of an optical pick-up as set forth in claim 6, wherein the magnetic pieces remain in a magnetically saturated condition by setting a density of a magnetic flux in a plain orthogonal to a direction of a primary magnetic flux of said magnet to be less than a saturation flux density of the magnetic pieces.

11. A method of modulating resonance frequency of a lens holder in an objective lens driving system of an optical pick-up having:

a lens holder which holds an objective lens and has a shaft hole;

a fixed member which has a journal inserted into said shaft hole;

a driving coil and a magnet which are arranged opposite each other so as to generate a magnetic force for driving said lens holder along said journal; and a magnetic piece which is arranged opposite said magnet to hold said lens holder at a neutral position using said magnetic force generated between said magnet and said driving coil while said driving coil is not excited, said method comprising the steps of:

using a magnetic piece which is magnetized until it is saturated by an emf from the magnetic field generated by said magnet; and changing said magnetic piece to another magnetic piece with different volume, while the saturation flux density for said magnetic piece is maintained constant, to modulate the resonance frequency of said lens holder.

12. The method of modulating the resonance frequency of a lens holder in an objective lens driving system of an optical pick-up as set forth in claim 11, wherein an attraction force exerted on the magnetic pieces is defined by a saturation flux density, said attraction force not being affected by a variation of a permeability of the magnetic pieces.

13. The method of modulating the resonance frequency of a lens holder in an objective lens driving system of an optical pick-up as set forth in claim 11, wherein the magnetic pieces remain in a magnetically saturated condition by setting a density of a magnetic flux in a plain orthogonal to a direction of a primary magnetic flux of said magnet to be less than a saturation flux density of the magnetic pieces.

* * * * *